United States Patent [19]

McMurtry et al.

[11] Patent Number: 5,228,352
[45] Date of Patent: Jul. 20, 1993

[54] SIGNAL PROCESSING CIRCUIT FOR TRIGGER PROBE

[75] Inventors: David R. McMurtry, Wotton-Under-Edge; Clifford W. Archer, Dursley, both of United Kingdom

[73] Assignee: Renishaw Metrology Limited, Gloucestershire, United Kingdom

[21] Appl. No.: 907,128

[22] Filed: Jul. 1, 1992

[30] Foreign Application Priority Data

Jul. 3, 1991 [GB] United Kingdom ............ 9114353
Jul. 3, 1991 [GB] United Kingdom ............ 9114371

[51] Int. Cl.$^5$ .............. G01M 19/00; G01B 3/22; G01B 5/00
[52] U.S. Cl. .................. 73/865.8; 33/558; 33/561
[58] Field of Search ............ 73/865.8; 33/556-561, 33/558

[56] References Cited

U.S. PATENT DOCUMENTS

| | | | |
|---|---|---|---|
| 3,354,399 | 11/1967 | Houpt et al. | 340/870.09 |
| 4,109,200 | 8/1978 | McNulty | 33/558 |
| 4,158,919 | 6/1979 | McMurtry | 33/174 L |
| 4,512,083 | 4/1985 | Schmitt et al. | 33/558 |
| 4,513,507 | 4/1985 | Laskowski | 33/169 R |
| 4,817,362 | 4/1989 | Archer | 33/561 |
| 4,866,854 | 9/1989 | Seltzer | 33/558 |
| 4,882,848 | 11/1989 | Breyer et al. | 33/559 |
| 5,024,003 | 6/1991 | Breyer | 33/559 |
| 5,084,696 | 1/1992 | Guscott et al. | 340/309.15 |

FOREIGN PATENT DOCUMENTS

| | | |
|---|---|---|
| 0242747 | 10/1987 | European Pat. Off. |
| 2039048 | 7/1980 | United Kingdom . |
| 1586052 | 3/1981 | United Kingdom . |
| WO85/04706 | 10/1985 | World Int. Prop. O. |
| WO88/01726 | 3/1988 | World Int. Prop. O. |

OTHER PUBLICATIONS

Patent Abstracts of Japan, vol. 8, No. 105 (p-274) (1542) 17 May 1984 & JP-A-59 015 804 (Mitsutoyo Seisakusho K.K.) 26 Jan. 1984.

Primary Examiner—Hezrone E. Williams
Assistant Examiner—George M. Dombroske
Attorney, Agent, or Firm—Oliff & Berridge

[57] ABSTRACT

A touch trigger probe for machine tools or coordinate measuring machines has three strain gauges 10A-C, which respond to deflection of a stylus of the probe when it contacts a workpiece. The signals from the strain gauges are each rectified by precision rectifiers 18A-C, and then combined at a summing junction 20. A first comparator 28 compares the combined signal with a threshold voltage $V_{ref1}$, to produce a sensitive trigger signal. A second comparator 30 compares the combined signal with a higher threshold voltage $V_{ref2}$, which produces a confirmation signal. This confirms that the trigger signal is caused by a genuine workpiece contact, and not caused falsely by vibration or acceleration.

8 Claims, 2 Drawing Sheets

SIGNAL PROCESSING CIRCUIT FOR TRIGGER PROBE

FIELD OF THE INVENTION

This invention relates to trigger probes such as used on coordinate measuring machines (CMMs) and machine tools. More particularly, it relates to circuits for processing the signals produced by such probes.

DESCRIPTION OF PRIOR ART

A known class of such trigger probes utilises high sensitivity stress or strain sensors in order to detect contact between a deflectable stylus of the probe and a workpiece. The sensors may for example be piezoelectric crystals or silicon strain gauges, though other sensors are also possible such as electro-magnetic LVDTs and capacitance sensors. The sensors detect the small levels of force exerted on the stylus when it contacts a workpiece. A trigger signal is developed by a signal processing circuit when the sensor output exceeds a predetermined threshold, thereby indicating that contact has taken place. Examples of such probes are shown in U.S. Pat. No. 4,817,362 (assigned to Renishaw) and British Patent No. 1,586,052 (Carl Zeiss).

The Zeiss patent discusses a possible problem, namely that unintended vibration of the CMM or machine tool in which the probe is mounted can cause the sensitive sensors to react and produce a false trigger signal. A similar false trigger signal can occur if the stylus deflects dynamically as a result of acceleration. One way to avoid such problems would be to adjust the trigger threshold to suit the level of vibration encountered on the particular machine to which the probe is mounted. Not only is this an inconvenient and uncertain process, but also it means that the sensor sensitivity is reduced if the machine suffers from high vibration levels.

The Zeiss patent therefore discloses various ways of producing a second, confirmation signal, which indicates that the initial trigger signal was caused by genuine contact with the workpiece, rather than by vibration. In practical use, the initial trigger signal is used to latch or freeze the outputs of counters of the CMM or machine tool, indicating the instantaneous x,y,z, coordinate position of the probe within the working volume of the machine. The second, confirmation signal is used to cause a controller of the machine to act upon the frozen counter outputs. Thus, a false initial trigger signal is ignored by the machine controller if it is not followed by a confirmation signal.

Although the Zeiss patent describes several ways of producing the confirmation pulse, these ways are either complex or potentially unreliable. Commercial embodiments of the probe described therefore develop the confirmation signal by electrical switching through contact elements which form a kinematic support for the stylus within the probe. Deflection of the stylus from its rest position defined by the kinematic support breaks an electrical circuit through the contact elements. Whilst this arrangement is reliable, it still involves the necessity to connect electrical wiring to the kinematic support elements. Furthermore, all such arrangements for providing a confirmation signal necessitate an extra electrical connection between the probe and the machine, for carrying the confirmation signal. In some cases it can be desirable to avoid such a separate electrical connection, although the present invention is not restricted to this.

SUMMARY OF THE INVENTION

One aspect of the present invention provides a signal processing circuit for a trigger probe having at least one sensor producing an analogue output signal, the circuit comprising a first threshold detector for producing a trigger signal when the level of the analogue signal passes through a first threshold level, and being characterised by a second threshold detector which produces a confirmation signal when the analogue signal passes through a second threshold level which is higher than the first threshold level.

A second aspect of the present invention provides a signal processing circuit for a trigger probe having a plurality of sensors, the circuit comprising:

a plurality of signal conditioning circuits, one for each sensor, for conditioning the output of the corresponding sensor, for example by rectifying or squaring it, to produce a unipolar output;

a circuit for combining the unipolar outputs of the plurality of conditioning circuits, for example by adding them together; and a comparator for detecting when the combined output exceeds a predetermined threshold and producing a trigger signal in accordance therewith.

BRIEF DESCRIPTION OF THE DRAWINGS

Embodiments of the invention will now be described by way of example, with reference to the accompanying drawings, wherein.

DESCRIPTION OF PREFERRED EMBODIMENTS

Figure 1:
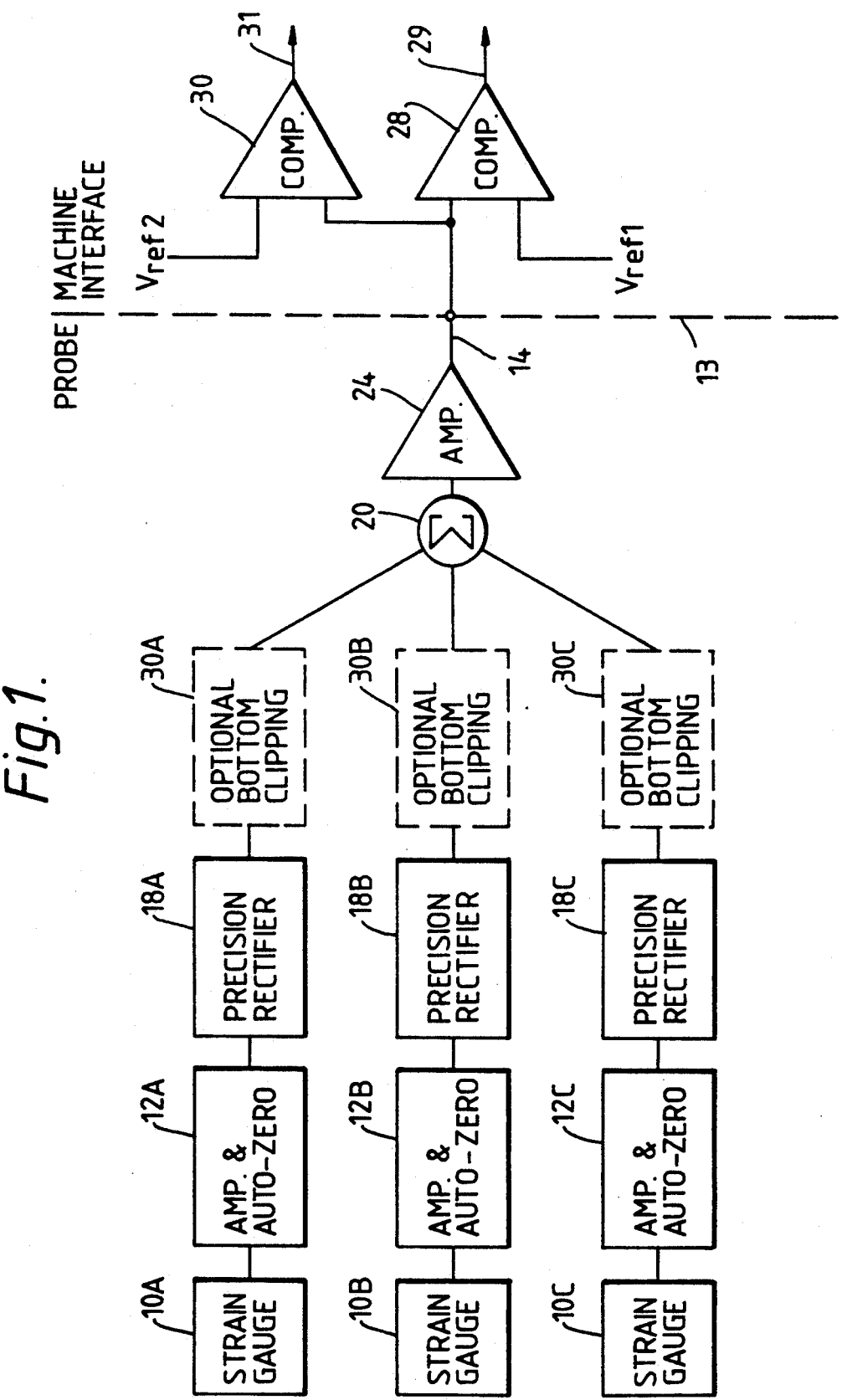
FIG. 1 is a schematic circuit diagram of a first embodiment.

The embodiments to be described are intended for processing the signals from a probe of the type described in U.S. Pat. No. 4,817,362 and reference should be made to that patent for further details of the arrangement of the probe. Circuit elements to the left of a broken line 13 in FIG. 1 represent components mounted within the probe itself, whereas those to the right of the line 13 are provided within an interface unit for interfacing the probe with the controller of a CMM or machine tool on which the probe is mounted. The interface may be mounted at any convenient location on the machine. In this example, there need be only two wires connecting the probe to the machine interface, namely a signal wire 14, and an earth return (not shown).

The probe according to U.S. Pat. No. 4,817,362 is provided with three sensors in the form of strain gauges, spaced at equal angular intervals around the axis of the probe. The probe has a stylus which is deflectable from a kinematically-defined rest position upon contact with a workpiece, causing variations in the resistances of the strain gauges. FIG. 1 shows the three strain gauges, 10A,10B,10C. Of course, other sensors can be used, such as piezo transducers which produce an output signal depending on deflection or force applied to the stylus.

Figure 2:
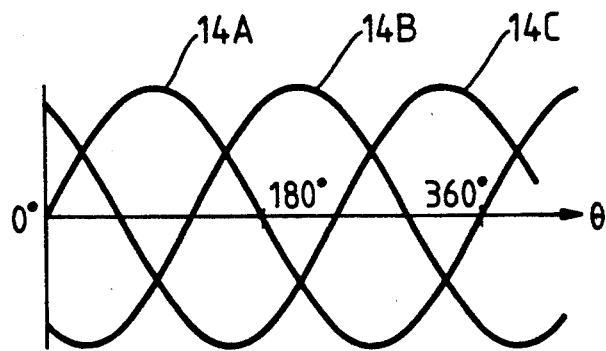
FIG. 2 is a graph showing the response of strain gauges in the embodiment of FIG. 1 to various deflections.

FIG. 2 shows at 14A,14B and 14C respectively the response curves of the strain gauges 10A,10B,10C to a given magnitude of stylus deflection, plotted against the direction of that deflection. The direction is given in terms of an angle $\theta$ between 0° and 360° about the axis of the probe. It will be seen that the response of each strain gauge varies approximately sinusoidally with the angle of the direction, assuming a constant deflection. Although similar responses are obtained from all three strain gauges, the response curves are shifted approximately 120° from each other, because the three strain gauges are spaced at equal angles around the axis of the probe.

The voltage signal from each of the strain gauges 10A–C is taken to a respective circuit 12A–C which provides amplification and auto-zeroing to compensate for drift, in the same way as described in U.S. Pat. No. 4,817,362. The outputs of these circuits are each rectified in respective precision full-wave rectifier circuits 18A–C. This produces unipolar signals with the response curves shown at 16A–C in FIG. 3. In a simple embodiment, these are fed straight to a summing junction 20 at the input of an amplifier 24, which combines the signals by adding or mixing them so as to produce an output to the machine interface on the line 14. The response curve of this output is as shown by the broken line 26 in FIG. 3. It will be understood that this broken line represents a plot of the overall response of the circuit to a given magnitude of deflection of the stylus, plotted against the direction $\theta$ of that deflection.

In the machine interface, the analogue signal from line 14 is supplied to two comparators 28,30. The first comparator 28 compares the analogue signal level to a predetermined reference threshold voltage $V_{ref1}$. This reference threshold defines a trigger threshold for the strain gauge signals, so that a trigger output signal is produced when the analogue signal rises and passes through the threshold level. The trigger output is taken to the machine's controller on a line 29, and is used to latch or freeze counter outputs indicating the x,y,z coordinates of the probe at the instant of the trigger. The level of $V_{ref1}$ may be adjustable, and can be set at a low level so that the sensitivity of the probe is high. It is therefore possible that a trigger signal may be provided falsely in reaction to vibration or dynamic deflections of the probe stylus when the probe is accelerated.

The second comparator 30 compares the analogue signal on the line 14 to a second predetermined threshold voltage $V_{ref2}$, which is higher than $V_{ref1}$. The level of $V_{ref2}$ is selected such that although the comparator 28 may provide a false trigger signal, nevertheless the output signal on line 31 from the comparator 30 reliably indicates that stylus deflection due to workpiece contact has taken place (though obviously this indication is with much lower sensitivity). The signal on the line 31 is taken to the machine controller as a confirmation signal indicating the validity of the initial trigger signal on the line 29.

The level of $V_{ref2}$ may be adjustable or selectable by the user, so that he can set it at the lowest level consistent with reliable operation on a particular machine or type of machine. He can also reset it at a higher level if problems occur in practice, e.g. if vibration increases as the machine gets older.

When the confirmation signal is received, the latched counter output readings are taken by the machine controller and used in the normal way, and the movement of the probe towards the workpiece is stopped, in the normal manner. If no confirmation signal takes place after a predetermined time, the coordinate data which was latched upon receipt of the trigger signal on the line 29 is ignored.

Figure 3:
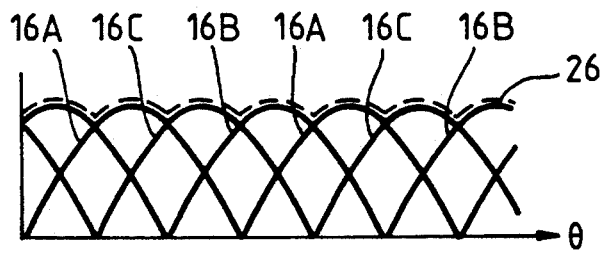
FIG. 3 is a graph showing the result of combining signals in FIG. 1.

The values of the maxima and minima in the broken line 26 in FIG. 3 vary from each other by only about 13% of the peak value of the response curve. This value is a theoretical calculation based upon the assumption that the response of a strain gauge as shown in FIG. 2 is truly sinusoidal, and that the maximum amplitudes of the rectified signals 16A–C in FIG. 3 are equal. In practice, we have found that the responses are indeed reasonably sinusoidal, and the amplitudes may be equalised, if necessary, by adjusting the gain in each of the amplifier and auto-zero circuits 12A–C.

Thus, the pretravel variation of the trigger signal on line 29, resulting from the variation of the strain gauge response with the direction $\theta$, is theoretically only 13%. Measurements on practical embodiments have shown pretravel variations of 16.8% or better. This compares with a value of about 50% for the corresponding circuitry shown in U.S. Pat. No. 4,817,362.

Figure 4:
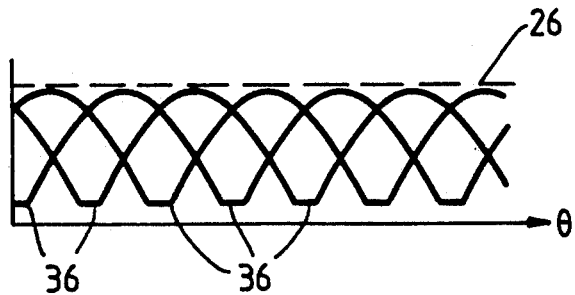
FIG. 4 is a graph corresponding to FIG. 3, but of a modified embodiment.

FIG. 1 shows additional circuits 30A,30B,30C which may optionally be provided between the respective precision rectifiers 18A–C and the summing junction 20. These circuits are arranged to clip the bottoms of the response curves 16A–C, preventing the outputs of the precision rectifiers from falling below a certain predefined level. This is illustrated in FIG. 4, at the points 36. The effect is to smooth out the broken line 26 which illustrates the response of the output of the summing amplifier 24 at various deflection angles. This is because the bottom clipping causes the minima in the response curve 26 to be raised slightly. Since the variation between the maxima and minima of the response curve 26 in FIG. 3 is approximately 13%, it follows that to achieve the desired smoothing, the predetermined level at which the bottom clipping 36 should take place is approximately 13% of the peak values of the signals 16A–C.

The bottom clipping circuit is more easily realised with precision if the signals produced by the rectifier circuits 18A–C are relatively large. The bottom clipping can be achieved in any conventional manner, such as a limiting diode to prevent the output of the circuit 18 falling below the desired predetermined level. Alternatively, the bottom clipping circuit can be built into the precision rectifier circuit. If the signal levels are too small to permit the bottom clipping to be realised precisely, it may be preferred to omit it.

If desired, the precision rectifier circuits 18A–C may be replaced by precision squaring circuits. These circuits can be built in any known manner in order to produce a unipolar output which is the square of the input. For example, they may consist of a multiplier circuit which multiplies the input by itself. The bottom clipping circuits 30A–C are not necessary. Considering the response curves of the strain gauges as shown at 14A–C in FIG. 2, it can be shown that the result of squaring each of these responses and then adding them together in the summing amplifier 24 is to produce an overall output response which is independent of the angle $\theta$. That is, for a given deflection of the probe stylus, the output of the summing amplifier 24 is independent of the angle of the deflection, and consequently the circuit does not introduce any pretravel variation. A possible disadvantage to the circuit may be that conventional electronic squaring circuits are relatively complicated and expensive to build. The circuit in FIG. 1 is therefore preferred at present.

Instead of the rectifiers 18A-C, summing junction 20, amplifier 24 and comparator 28, it is possible to use trigger detection circuitry similar to that described in U.S. Pat. No. 4,817,362. This involves three window comparators, one per strain gauge sensor, each of which receives the output of the corresponding amplification and auto-zero circuit 12A-C. These window comparators have positive and negative thresholds which are set to low levels for sensitivity, and their outputs are combined in an OR gate to give the required sensitive trigger signal. The comparator 30 is replaced by three additional window comparators, connected in parallel with the window comparators of U.S. Pat. No. 4,817,362. The additional window comparators also each receive the output of a corresponding one of the circuits 12A-C, but they have positive and negative thresholds which are set to higher levels, so that they are not prone to false triggering. Their outputs are likewise combined, in a further OR gate, to give the confirmation signal.

Various other modifications may be made if desired. For example, the entire circuit illustrated in FIG. 1 may be built into the probe, or alternatively more parts of the circuit may be built into the machine interface instead of into the probe as illustrated. Multiple connections between the probe and the interface will then be required. Another possibility is to provide a comparator which can be connected in place of the amplifier 24 by connecting appropriate links within the probe. This enables the probe to be used either in the manner described above, or in a more conventional manner in which it delivers a straightforward trigger output, simply by selecting the appropriate link. Of course, it will also be appreciated that similar circuits can be built for sensors other than the three strain gauges 10A-C, such as piezoelectric sensors; and that there may be any number of sensors (if there is only one sensor, then the summing junction 20 is not necessary). To enable circuits to be built into a probe of small physical dimensions, it can be advantageous to provide them in a customised, application specific integrated circuit (ASIC).

We claim:

1. A signal processing circuit in combination with a trigger probe having at least one sensor producing an analogue output signal having a value which increases as the trigger probe engages and continues to move toward an object, the circuit comprising a first threshold detector for producing a trigger signal when the level of the analogue signal passes through a first threshold level, and a second threshold detector for producing a confirmation signal when the level of the analogue signal passes through a second threshold level which is higher than the first threshold level.

2. A combination according to claim 1, wherein the second threshold level is adjustable.

3. A combination to claim 1, wherein the first threshold level is adjustable.

4. A combination according to claim 1, wherein said first and second threshold detectors are built into an interface which is separate from the trigger.

5. A combination according to claim 1, wherein said probe includes a plurality of sensors, and the circuit includes means for combining the output signals of said sensors to form said analogue signal which is passed to the first and second threshold detectors.

6. A combination according to claim 5, further including a plurality of signal conditioning circuits, one for each sensor, for conditioning the output of the corresponding sensor to produce a unipolar output, the outputs of the signal conditioning circuits being combined by said combining means.

7. A combination according to claim 6, wherein each signal conditioning circuit comprises a rectifier for rectifying the output of the corresponding sensor.

8. A signal processing circuit in combination with a trigger probe having a plurality of sensors, each sensor outputting an analogue output signal having a value which increases as the trigger probe engages and continues to move toward an object, the circuit comprising:
   a plurality of signal conditioning circuits, one for each sensor, for rectifying the output of the corresponding sensor to produce a unipolar output;
   a combining circuit for combining the unipolar outputs of the plurality of conditioning circuits; and
   a comparator for detecting when the combined output of said combining circuit exceeds a predetermined threshold and for producing a trigger signal when said combined output exceeds said predetermined threshold.

* * * * *